atent [19] [11] 4,028,083

Patznick et al. [45] June 7, 1977

[54] METHOD AND APPARATUS FOR CONTROLLING TEMPERATURE WITHIN A FURNACE

[75] Inventors: Richard Arthur Patznick, Toledo; Gary Clayton Border, Bowling Green, both of Ohio

[73] Assignee: Johns-Manville Corporation, Denver, Colo.

[22] Filed: Oct. 16, 1975

[21] Appl. No.: 622,931

Related U.S. Application Data

[63] Continuation of Ser. No. 498,688, Aug. 19, 1974, abandoned.

[52] U.S. Cl. .................................. 65/29; 65/161; 65/162; 65/DIG. 13
[51] Int. Cl.² ........................................ C03B 5/24
[58] Field of Search ........ 65/29, 161, 162, DIG. 13

[56] References Cited

UNITED STATES PATENTS

| 1,961,894 | 6/1934 | Wadman et al. | 65/162 |
| 3,573,017 | 3/1971 | Griem, Jr. | 65/29 X |
| 3,779,731 | 12/1973 | Pollock | 65/29 |
| 3,915,682 | 10/1975 | Chotin et al. | 65/29 |

Primary Examiner—Arthur D. Kellogg
Attorney, Agent, or Firm—Robert M. Krone; Joseph J. Kelly; John H. Miller

[57] ABSTRACT

A furnace, which includes a melting and refining tank and a forehearth, is divided into a plurality of zones or regions. Each of the zones is provided with means for sensing temperature within the zone and a means for heating the zone. Means is also provided for measuring the individual heat input into the furnace of the heating means in each of the zones. When changes in temperatures are required, the temperatures in the different zones of the furnace are controlled by adjusting the heat input of the heating means in at least one of the zones to cause the temperatures in each of the zones where changes in temperature are required to approach desired temperatures. The adjustment is made in response to the last sensed temperature in a time period for each of the zones and in response to at least some of the temperatures sensed and the heat inputs measured in each of the zones during that time period so as to compensate for thermal lags within the furnace and the effect of heat input in any one of the zones on the temperatures in other of the zones.

14 Claims, 3 Drawing Figures

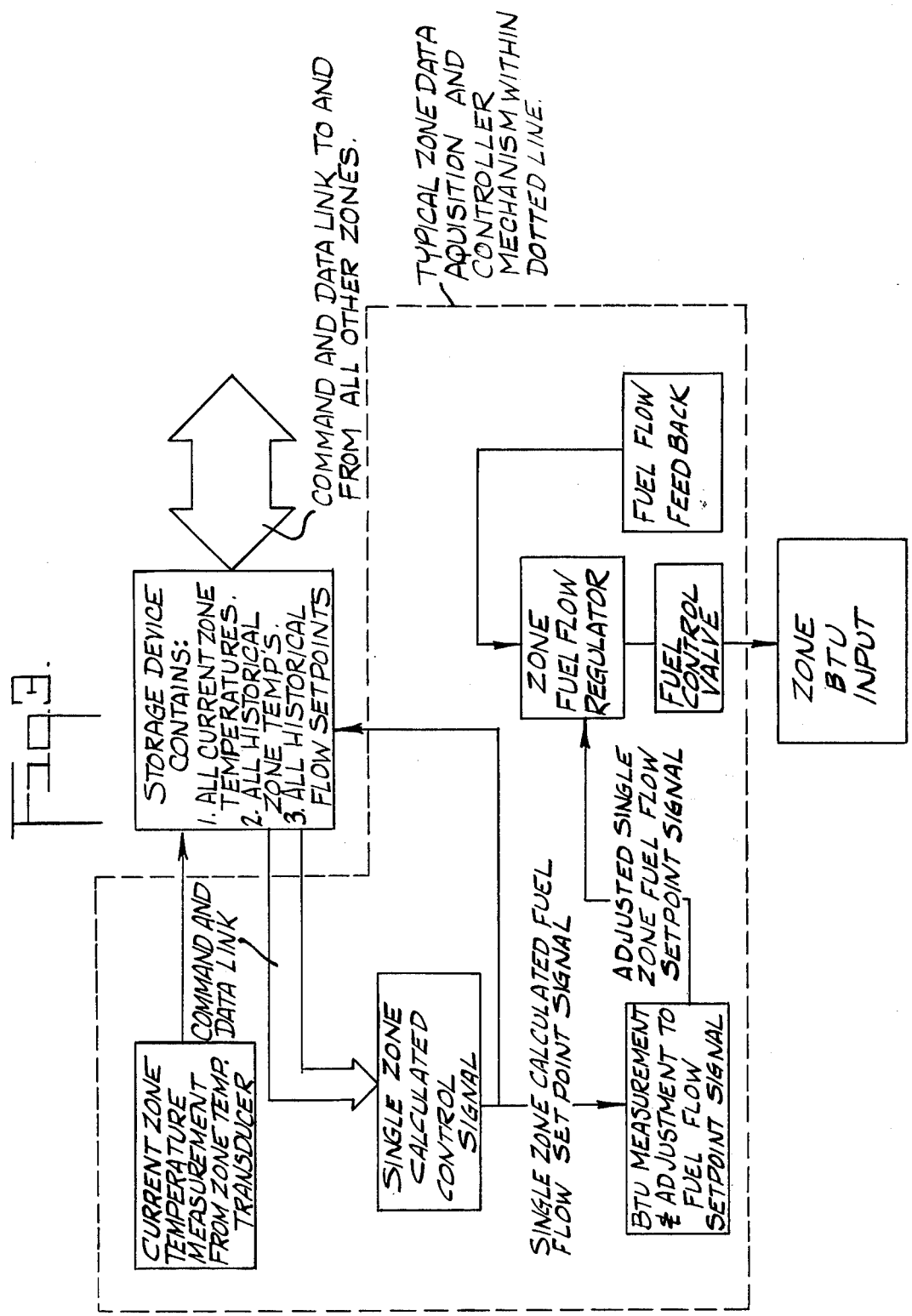

METHOD AND APPARATUS FOR CONTROLLING TEMPERATURE WITHIN A FURNACE

This is a continuation of application Ser. No. 498,688, filed Aug. 19, 1974, now abandoned.

BACKGROUND OF THE INVENTION

The present invention is directed to an improved method and apparatus for controlling operating temperatures within a furnace and in particular to a method and apparatus which compensates for thermal lags within the furnace and the interactions of the heat inputs of multiple heating units within a furnace.

The control system of the present invention is designed to be utilized in a furnace of a process for producing a product from molten material. While the control system is applicable to processes for producing many different products from various materials, for the purpose of illustrating the invention, the control system will be described in connection with a glass melting and refining process.

The furnace for such a process typically includes a melting and refining tank that is provided with at least one feeder for supplying raw batch material to the tank and a forehearth for distributing the molten glass to bushings, spinners, or other glass fiberizing means which are conventional in the art. Such furnaces typically include a series of burners, electrodes or other heat input means located along the length of the furnace to heat the glass as it passes through the tank and into the forehearth.

In order to properly melt and refine the glass in the furnace for a particular end use, a specific temperature profile for the glass should be established in the furnace. For example, in a furnace with a plurality of heating zones in the melting and refining tank, it may be desirable to have a glass temperature of about 2300° F at the batch feed end of the tank and a glass temperature of about 2500° F at the forehearth end of the tank with the glass temperature being held to certain desired temperatures in the regions intermediate the ends of the tank. Each of these intermediate temperatures may be different and in many cases are different from the temperatures in the other zones.

Attempts have been made to regulate the glass temperature within the furnace to obtain a desired temperature profile, such as the one described above, by means of a single regulator which is utilized to control the fuel-air supplies for all of the burners in the furnace. In one system, the control of the glass temperature is based on the regulation of the atmospheric temperature above the glass which is sensed by a single temperature transducer. It is not difficult to maintain the temperature adjacent the temperature transducer at its desired level. However, this system has two drawbacks. There is no one single glass or atmospheric temperature in the furnace. There are a multiplicity of different temperatures throughout the volume of the furnace in both the glass and the atmosphere over the glass. In addition, while measuring a single atmospheric temperature within the furnace is relatively easy and in certain cases controlling such an atmospheric temperature is not very difficult, the control system is not adapted to control temperatures in the glass being melted and refined, but only the hot exhaust gases above the glass. Consequently, while atmospheric temperature can serve as important guidelines in a furnace operation, it appears to be of greater importance to accurately measure the temperature within the glass in an attempt to regulate the glass temperatures throughout the furnace.

Another control system utilized in the prior art is one such as that disclosed in the patent to Griem Jr., U.S. Pat. No. 3,573,017, issued Mar. 30, 1971. This patent discloses a method and apparatus for melting and supplying heat softenable materials in a process wherein a crown temperature above the glass and glass temperatures are measured and fed to a furnace temperature controller which through a single regulator adjusts the fuel air supply to all of the burners within the furnace. The difficulty with this system is that the input from the different temperature sensors are utilized to adjust the heat input of all of the burners with no consideration being given to thermal lags within the furnace and the interaction between the heat input of the burners. The temperature in the throat could be at the desired level while the temperature at the rear of the furnace tank is too low. Yet to correct for the low temperature at the rear of the furnace the heat input of the burner at the throat is also increased thereby raising the temperature in that region above the desired level.

In other control systems, the furnace is divided into zones with each zone having an atmospheric temperature sensing means or glass temperature sensing means, burners and a fuel-air supply regulator for each set of burners. In this system, there is a temperature set point for each zone. The temperature sensed in each zone is fed independently into each individual regulator which attempts to maintain the heat input for its zone to maintain the predetermined set point temperature. This system generally performs very poorly. The heat input into one zone not only affects the regulated temperature in that zone but the regulated temperature in other zones as well. There is an interaction between zones which is not accounted for.

All of the systems discussed above have failed to adequately take into account at least two important aspects of the process. There is a thermal lag between a change in the heat input of a set of burners, electrode or other heating means and changes in the glass or atmospheric temperatures throughout the furnace. In fact, it can take several hours before an adjustment in heat input is reflected in a temperature change in some zones of the furnace. In addition, the heat input into one zone of a furnace affects the glass and atmospheric temperatures in other zones of the furnace. It is an object of the present invention to overcome the problems associated with the control systems of the prior art by accounting for both the thermal lags in the furnace and the interaction between various zones of the furnace due to the changes in the heat input into one or more of the individual zones.

In the present invention, an accurate control of a desired glass temperature profile within a furnace is obtained by dividing the furnace up into arbitrary zones or regions wherein each zone is provided with a means for heating the glass within the furnace, a means for adjusting the amount of heat input of the heating means and a means for sensing a temperature in each zone. To effect the control of the temperatures in the separate zones, the temperatures for each of the zones are sensed and recorded for a predetermined period and the heat input into the furnace for heating means of each zone is measured and recorded for the same period. If any of the sensed temperatures are not at the proper level, the heat input of the heating means, for at least one of the zones, is adjusted to cause the temperatures in each of the zones which are not at the proper level to approach the desired temperatures. This adjustment is made in response to the last sensed temperature for each of the zones in the aforesaid time period and at least some of the temperatures sensed and the heat inputs measured in each of the zones during the same time period so as to compensate for thermal lags within the furnace and the interaction between the heat inputs in the various zones.

BRIEF DESCRIPTION OF THE DRAWINGS

FIGS. 2 and 3 are schematic representations of the control system of the present invention.

DETAILED DESCRIPTION OF THE PREFERRED EMBODIMENTS

Figure 1:
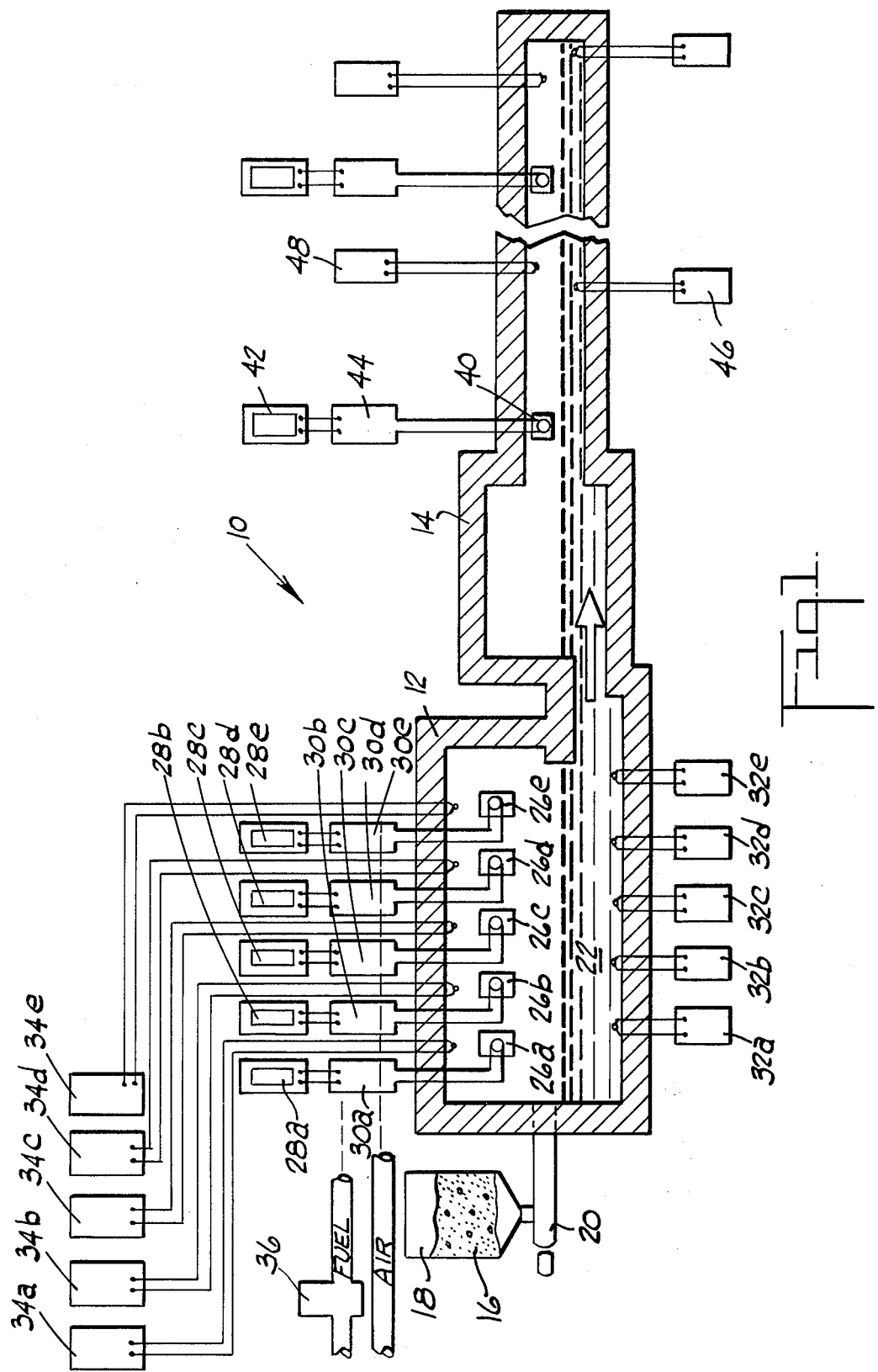
FIG. 1 is a schematic view of a typcial furnace utilizing the control system of the present invention.

FIG. 1 illustrates a furnace 10 which includes a melting and refining tank 12 and a forehearth 14. The furnace is constructed of a refractory material and receives glass batch or cullet 16 from a supply bin 18. The raw batch or cullet is conveyed to the furnace by means of one or more screw feeders 20 which are driven and controlled in a conventional manner to maintain a constant level of molten glass 22 within the furnace.

The tank 12 of the furnace 10 has been arbitrarily divided into five zones. Each zone is heated by a multiplicity of gas or oil fired burners 26a, 26b, 26c, 26d, and 26e. The heat input to the furnace for each set of burners is controlled by conventional fuel-flow regulators 28a, 28b, 28c, 28d, and 28e, e.g., remotely controlled valve control motors. These fuel-flow regulators control the fuel-air supply to the sets of burners by adjusting the settings of fuel and/or air supply valves 30a, 30b, 30c, 30d, and 30e. Each zone is provided with at least one temperature sensing means such as temperature transducers or thermocouples 32a, 32b, 32c, 32d, and 32e located adjacent the floor of the tank which measures the zone temperature within the glass for the particular zone.

In addition, each zone can be provided with at least one temperature transducer 34a, 34b, 34c, 34d, or 34e located near the crown of the tank which can be used along with or in place of the transducers within the glass to measure the zone temperature of a particular zone.

Since the regulators 28a, 28b, 28c, 28d, and 28e regulate the amount of fuel-air supplied to the burners 26a, 26b, 26c, 26d, and 26e to control the BTU or heat input into the furnace a conventional BTU analyzer 36 (e.g., an analyzer marketed under the trade name REINEKE calorimeter) can be placed into the fuel supply system to analyze the BTU value of the gas. The measurement from this BTU analyzer can generate a signal which is used to modify a control signal to the regulators. The regulators adjust the fuel and/or air flow rate through the valves 30 to the burners to compensate for variations in the BTU value of the gases being supplied to the burners. With this system, the BTU output of the burners will be maintained at a constant output even if there are fluctuations in the BTU values of the gas supplied to the burners.

After the molten glass exits from the melting and refining tank 12 of the furnace through the throat 40 to the forehearth 14, the molten glass is fed to one or more producing devices such as bushings or spinners (not shown). There the glass is formed or attenuated into staple fibers, continuous strands or other products through conventional processes.

The forehearth area of the furnace is also divided into a series of zones with each of the zones having at least one burner 40, a fuel-flow regulator 42, a fuel-flow supply valve 44, and in-glass temperature transducers 46 or atmospheric temperature transducers 48 or both.

It should be noted that although a gas or oil fired furnace has been illustrated and described for the purpose of illustrating the present invention, any number of means and methods for supplying and controlling the BTU input or heat energy input to the furnace to supply the heat required for the furnace can be utilized. For example, this invention would apply equally well to furnaces which are heated by electrodes or similar means.

Figure 2:
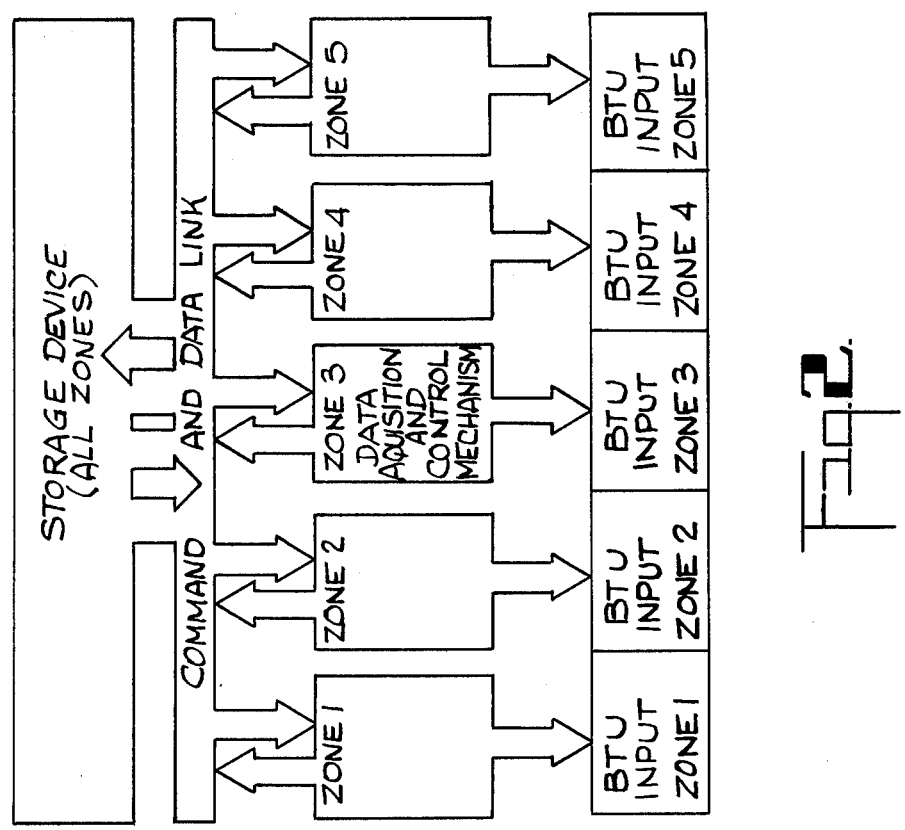

Referring now to FIGS. 2 and 3, the control system for a furnace such as the one illustrated in FIG. 1 will be discussed in detail. For the purposes of illustration, a five zone control system for the tank illustrated in FIG. 1 will be discussed. However, the same system can be used in any multi-zone furnace and in the forehearth of such a furnace.

The temperature being regulated in each zone of the furnace is affected by the heat or BTU input of the burners for that zone and the heat or BTU input of the burners for other zones as well. In addition, there are thermal lags between a change in the BTU input for one or more zones and the measurement of a temperature change or changes by the temperature transducers located either above or in the glass.

The control system of the present invention successfully controls temperatures in a furnace such as the one illustrated in FIG. 1, when the temperatures being measured and used in the control process are measured in the molten glass. However, if it is desirable in a particular process to control temperatures in a furnace by regulating atmospheric temperatures, the control system of the present invention can perform this function equally as well.

As shown in FIG. 2, the control system of the present invention requires separate data acquisition means for each zone. The separate data acquired for each zone comprises independent temperature measurements made by the temperature transducers 32 or 34 and a recording of the fuel-flow set points used for the regulators 28 in each zone. While this data can be collected continuously or at shorter intervals, the data is normally collected every time a new fuel-flow control action is computed for the control system. This data is fed to a storage device of a digital computor. The data is accumulated in this storage device from all of the zones for a period of time. Consequently, just prior to the calculation of a control signal by the computor, the storage device of the computer has all current zone temperatures, all historical zone temperatures and all historical fuel flow set points. This data is mathematically weighed by the computer to generate a signal for each zone. The signals are sent through the command and data link of the system to the individual regulator 28 of each zone which, as shown in FIG. 3, is part of the control mechanism for each zone. As shown in FIG. 3, the fuel-flow set point control signal is not only fed to the regulator for the specific zone, but also to the storage device to become part of the historical data on the fuel-flow set points for the zone.

If the BTU content of the gas remains relatively constant, the calculated control signal for the fuel-flow set point, which is based on an assumed BTU value of the gas, can be fed directly to the regulator 28. However, the control system is designed to regulate the temperatures in the furnace by adjusting the BTU input to one or more zones of the furnace. Consequently, if the BTU value of the gas varies significantly from the assumed value, the actual fuel-flow set point of the regulator must be adjusted. For this reason, the fuel-flow set point control signal from the computer is modified, as shown in FIG. 3, by input from the BTU analyzer so that the actual fuel-flow to the burners will give the desired BTU input for the furnace.

The mathematical weighing of the data from the storage device for a five zone furnace to obtain the calculated control signal for the BTU input (the zone fuel-flow set point) is preferably accomplished according to the following mathematical relationship:

$$u_i(t) = u_{oi} + \sum_{j=1}^{5} \left( \sum_{k=1}^{n} [a_{jk}(u_i(t-ek) - u_{oi}) + b_{jk}(s_j(t+e-ek) - s_{oj})] \right)$$

where:
- $u_i(t)$ is the BTU input (the zone fuel-flow setpoint) for the $i^{th}$ zone at time $t$.
- $e$ is some constant data acquisition interval of time (e.g., 1 hour).
- $s_j(t)$ is the temperature sensed by the $j^{th}$ thermal transducer at time $t$.
- $s_{oj}$ is the temperature of the $j^{th}$ zone about which the furnace performance has been linearized (the desired temperature for the $j^{th}$ zone).
- $u_{oj}$ is the nominal BTU input for the $j^{th}$ zone about which the furnace performance has been linearized.
- $n$ is an integer sufficiently large to account for the effects of the thermal lags within the furnace (e.g., if through the study of historical data of the furnace operation it is determined that the temperatures at the thermal transducers are still affected by a BTU input adjustment 5 hours after such an adjustment and the interval $e$ is 1 hour then $n$ would be 4).
- $a_{jk}$ is a scalar constant obtained by one of several feedback control approaches. While feedback control techniques such as stabilization theory and modal control methods can be used it is preferred to use linear optimal control theory with a quadradic performance index to obtain $a_{jk}$ from an A and B matrix which will be defined below.
- $b_{jk}$ is another scaler constant obtained in the same manner as $a_{jk}$ from an A and B matrix which will be defined below.

To obtain the A and B matrices a mathematical model which successfully accounts for thermal lags and zone interactions within the furnace has been developed. The preferred linearized model of the present invention is in the form:

$$x(t+e) - x_0 = Ax(t) - Ax_0 + Bu(t) - Bu_0$$

where:
- $e$ is the same constant data acquisition interval defined above.
- $x(t)$ is a state vector (column vector) composed of the temperatures for each zone at time $t$ (five temperatures for a five zone furnace) and a listing of the BTU inputs (fuel-flow set points) for all of the zones for the preceding $n$ (as defined above) time intervals. Where $n = 4$ and there are five zones a column vector with 25 entries is normally constructed. While at least those temperatures for time $t$ are used in the state vector, the mathematical relationship for calculating the control signal is set up to accomodate past temperature measurements and if desired, the state vector can include these past temperature measurements.
- $u(t)$ is control vector (column vector) composed of the BTU inputs (fuel-flow set points) of all of the zones at time $t$. For a five zone furnace the column vector would have five entries.
- $x_0$ is a constant version of the state vector about which system performance has been linearized. The vector is a column vector with 25 entries listing, for a five zone furnace, the five desired temperatures for the zones and the nominal BTU inputs for the zones for $n$ time intervals.
- $u_0$ is a constant version of the control vector about which the system performance has been linearized. The vector is a column vector with five entries of the nominal BTU inputs for a five zone furnace.
- $A$ is a constant matrix determined from the above model. For a five zone furnace where $n = 4$ the matrix is 25×25.
- $B$ is a constant matrix determined from the above model. For a five zone furnace where $n = 4$ the matrix is 25×25.

A and B are selected to make historical data satisfy the above model. Data on furnace temperatures and heat inputs for a particular furnace for a time period sufficient to obtain data on furnace performance under various conditions is obtained. The historical data is developed into A and B matrices by a technique such as least squares, minimum variance, maximum likelihood, or various frequency domain techniques. While least squares or minimum variance are preferred, the technique for arriving at the A and B matrices which satisfy the model should not be restricted to any particular technique since many will work.

Once A and B have been determined, these matrices are used to compute $a_{jk}$ and $b_{jk}$ by conventional linear optimal control theory with a quadradic performance index.

The present invention is not limited to the preferred embodiment disclosed in detail. The present invention can also be used to control the glass temperatures in the forehearth section of the furnace, either separately or in conjunction with the other zones of the furnace. In addition, other known mathematical techniques can be used to achieve essentially the same relationship between operating variables of a furnace for generating control actions. Also, other variables, such as changes in batch feed rate, can be incorporated into the present invention for the purpose of taking these variables directly into account when generating a control action.

What we claim is:

1. A method for controlling temperatures in a furnace which includes a melting and refining tank wherein the furnace has a plurality of zones through which molten material within the furnace passes, each zone having a means for sensing temperature, means for providing heat input into the zone, and regulator means for regulating the amount of heat input into the zone, said regulator means being responsive to a signal from a signal generating means, comprising:
  a. determining the desired temperature for each of said zones,
  b. sensing the current temperature in each zone adjacent the end of a regular time interval,
  c. measuring the total heat input into each of said zones during said regular time interval,
  d. accumulating first data in a storage device comprising all historical heat inputs representing the total heat input into each of said zones for each regular time interval during a preselected time period, said preselected time period comprising a plurality of said regular time intervals, and information on thermal lags in the furnace and interactions between the separate total heat inputs of the plurality of zones,
  e. after each regular interval comparing the last sensed temperature for each zone with the desired temperature level for that respective zone,
  f. when at least one of said last sensed temperatures differs from the desired temperature level for its respective zone, generating at least one new signal for the regulator means of said at least one zone by comparing said temperature difference with respect to the last sensed temperatures for each of said zones and said accumulated first stored data,
  g. sending said at least one new signal to at least one regulator means to adjust the total heat input into said at least one of the zones for the next said regular time interval to reduce any temperature difference between the actual zone temperature and the desired temperature for said zone, and
  h. after said signal generating step, adding data, representing any total heat input signal to said regulator means for said plurality of zones at the time of said sending step, to said accumulated first stored data to be used in the signal generating step after the next regular interval.

2. A method as in claim 1 and further comprising:
  a. accumulating second data in a storage device comprising the sensed temperatures in each of said zones during a preselected time period, said preselected time period comprising a plurality of said regular time intervals,
  b. said generating step also including comparing said temperature difference with respect to the last sensed temperature for each of said zones and said accumulated second stored data, and
  c. adding data representing the last sensed temperatures in each of said accumulated second data.

3. A method as defined in claim 1 wherein the temperatures sensed are those of the molten material in each of said zones.

4. A method as defined in claim 1 wherein the temperatures sensed are those of the atmosphere above the molten material in each of said zones.

5. A method as defined in claim 1 wherein the heating means are burners and the data representing the heat input into each of said zones is obtained by measuring the separate fuel flows to the burners in each of said zones.

6. A method as defined in claim 1 wherein at time $t$, which is the end of said time period, the signal is generated for at least one zone which is the $i^{th}$ zone of said multi-zone furnace which has $y$ number of zones in accordance with the relationship:

$$u_i(t) = u_{oi} + \sum_{j=1}^{y} \left( \sum_{k=1}^{n} [a_{jk}(u_j(t-ek) - u_{oj}) + b_{jk}(s_j(t+e-ek) - s_{oj})] \right)$$

7. A method as defined in claim 2 wherein at time $t$, which is the end of said time period, the signal is generated for at least one zone which is the $i^{th}$ zone of said multi-zone furnace which has $y$ number of zones in accordance with the relationship:

$$u_i(t) = u_{oi} + \sum_{j=1}^{y} \left( \sum_{k=1}^{n} [a_{jk}(u_j(t-ek) - u_{oj}) + b_{jk}(s_j(t+e-ek) - s_{oj})] \right)$$

8. Apparatus for controlling temperatures in a furnace which includes a melting and refining tank wherein the furnace has a plurality of zones through which molten material within the furnace passes, each zone having means for heating the molten material and a regulator means for adjusting said heating means, said regulator means being responsive to a signal, and each zone having a predetermined temperature to be maintained, comprising:
  a. means for sensing the current temperature in each of said zones adjacent the end of a regular time interval,
  b. means for comparing the last sensed temperature in each of said zones with said predetermined temperature level for each respective zone,
  c. means for measuring the total heat input into each of said zones during said regular time interval,
  d. first storage means for accumulating first data comprising all historical heat inputs representing the total heat input into each of said zones for each regular time interval during a preselected time period, said preselected time period comprising a plurality of said regular time interval and information on thermal lags in the furnace and interactions between the separate total heat inputs of the plurality of zones,
  e. signal generating means for generating at least one new signal for at least one regulator means when at least one of said sensed temperatures differs from the respective predetermined temperature, said signal generating means having means for generating at least one new signal in response to a comparison of said temperature for each of said zones and said accumulated first data in said first storage means.
  f. means for sending said at least one new signal to at least one regulator means to change the heat input into at least one of the zones to reduce any said temperature difference, and
  g. means for adding data representative of the heat inputs to each of said zones, after said new signal has been sent, to said first accumulated data to be used after the next regular time interval.

9. Apparatus as defined in claim 8 further comprising:
  a. means for accumulating second data comprising all of the sensed temperatures in each of said zones during a preselected time period, said preselected time period comprising a plurality of said regular time intervals, b. said comparison means also including means for comparison any said temperature difference with respect to the last sensed temperature for each of said zones and said second accumulated data, and c. means for adding data representing the last sensed temperatures to said accumulated second data.

10. Apparatus as defined in claim 8 wherein said temperature sensing means are located in said molten material.

11. Apparatus as defined in claim 8 wherein said temperature sensing means are located in the atmosphere above said molten material.

12. Apparatus as defined in claim 8 wherein said heating means are burners and said regulator means adjust the fuel flow to said burners.

13. Apparatus as defined in claim 8 wherein said signal generating means has means for generating said at least one new signal for at least one zone, which is the $i^{th}$ zone, at time $t$, which is the end of said time period, and wherein said furnace has $y$ number of zones, in accordance with the relationship:

$$u_i(t) = u_{oi} + \sum_{j=1}^{y} \left( \sum_{k=1}^{n} [a_{jk}(u_j(t-ek) - u_{oj}) + b_{jk}(s_j(t+e-ek) - s_{oj})] \right)$$

14. Apparatus as defined in claim 10 wherein said signal generating means has means for generating said at least one new signal for at least one zone, which is the $i^{th}$ zone, at time $t$, which is the end of said time period, and wherein said furnace has $y$ number of zones, in accordance with the relationship:

$$u_i(t) = u_{oi} + \sum_{j=1}^{y} \left( \sum_{k=1}^{n} [a_{jk}(u_j(t-ek) - u_{oj}) + b_{jk}(s_j(t+e-ek) - s_{oj})] \right)$$

* * * * *